Nov. 6, 1928.

V. CONTINSOUZA ET AL 1,690,770

CINEMATOGRAPH APPARATUS WITH CONTINUOUSLY FED FILM

Original Filed July 27, 1925

Patented Nov. 6, 1928.

1,690,770

UNITED STATES PATENT OFFICE.

VICTOR CONTINSOUZA AND MAURICE COMBES, OF PARIS, FRANCE.

CINEMATOGRAPH APPARATUS WITH CONTINUOUSLY-FED FILM.

Application filed July 27, 1925, Serial No. 46,459, and in France October 27, 1924. Renewed December 9, 1926.

The present invention relates to cinematograph apparatus with continuously fed film, comprising a series of lenses arranged at the periphery of a disc revolving at a uniform speed, parallel to the plane of advance of the film, and so located that one of its lenses accompanies each of the successive film pictures as the film passes through the beam of light.

The image projected by such apparatus exhibits continual lateral displacements upon the screen. This is due to the fact that the optical centres of the lenses describe circular arcs while the film performs a straight line movement, so that the axis of projection is deviated.

The invention has for its object to avoid this disadvantage; the present improvement is characterized by the fact that the lenses, instead of being mounted at fixed points on their supporting disc, are fitted to movable members guided in relation to the disc and controlled in such a way that the centre of each lense describes, during its passage through the luminous beam, a rectilinear path parallel to the axis of the film, with a uniform speed, which arrangement allows of achieving the desired fixity of the projected image.

In order to obtain the straight-line movement of the optical centres of the lenses, parallel to the axis of the film, during their passage through the luminous beam, it is sufficient to move the lenses nearer to or further from the rotary axis of the disc, to the required extent; but in this way variations of speed are introduced which will cause a falling off in the fixity of the image.

In order to remedy this, the lenses are given a corrective movement designed to re-establish the uniformity of the speed of the lenses.

The annexed drawing represents by way of example a continuous-feed cinematograph embodying the present invention.

Figure 1:
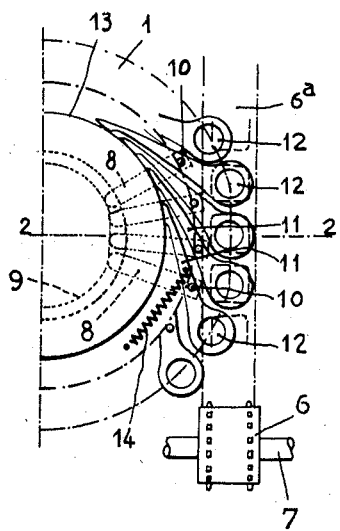

Figure 1 is a front view of the lens-carrying disc.

Figure 2:
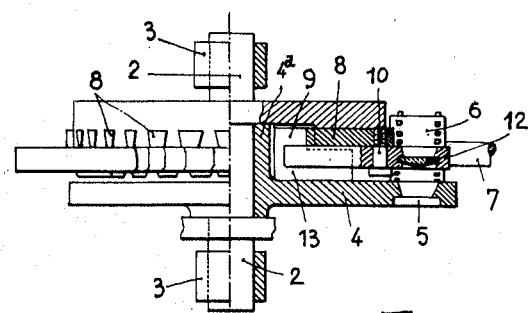

Figure 2 comprises on the left side a plan view of this same disc and on the right a section of the disc upon the horizontal plane 2—2 of Figure 1.

Referring to these drawings, 1 indicates the lens-carrying disc, keyed upon the shaft 2, journalled in bearings 3 upon the frame and passing through the socket 4ᵃ of a stationary plate 4 in which there is formed the aperture 5 past which the pictures on the film 6ᵃ are led by a sprocket drum 6 mounted on the driving shaft 7.

The disc 1 is slotted to receive sliders 8 the bases of which rest upon a cam 9 integral with the stationary plate 4. At the opposite end of these sliders there are mounted pivotally upon pins 10, levers 11 each of which carries one of the lenses 12 and of which the tails rest upon a cam 13 integral with the stationary plate 4. A spring 14 acts constantly to keep the sliders and the tail ends of the levers against their guiding cams.

The profile of the cam 9 is circular for the greater part of its circumference but presents, in the part corresponding to the passage of the lenses through the beam of light, a depression which serves to produce the displacement of the sliders in their slots towards the axis of rotation of the disc.

At this same moment, the tail ends of the corresponding levers enter upon the non-circular part of the cam 13 and these levers rock upon their pivots so as to impart to the lenses a corrective movement, which is the more rapid as the distance from these lenses to their axis of rotation has first been varied by the effect of the movement of the slider. As a result of the combination of these movements with the rotation of the disc, the optical centre of the lenses is displaced at a uniform speed parallel to the axis of the film during the passage through the beam of light.

It is quite evident that the invention is not limited to the forms and details of construction described above solely by way of explanation, and that it may give rise to a series of modifications based upon the same principle. Thus, in particular, the double supplementary movement might be communicated to the lenses by any suitable means, the lenses being further guided in relation to their supporting disc by the use of any suitable device.

What we claim is:

1. A cinematograph apparatus with continuously moving film comprising a rotary member adapted to revolve at a uniform speed on an axis parallel to the optical axis of the apparatus, a series of lenses, mounted for movement substantially toward and away from said axis of rotation on said rotary member, said rotary member being provided with a number of slots, a slider guided in each slot, a lever pivotally mounted upon each slider, a lens carried by each lever, a stationary cam adapted to act upon said sliders and to impart to the same a displacement adapted to give to the center of the corresponding lens a rectilinear path parallel to the axis of the film, and a second stationary cam adapted to act upon the pivotal levers and to displace the same so as to maintain a uniform linear speed for the center of the lens, during the passage thereof through the luminous beam, for the purpose described.

2. In an apparatus for optically rendering stationary a movable beam of light relative to a continuously moving surface, comprising a rotary member, elements, movable substantially radially, mounted on said rotary member, a series of optical elements, carriers for the optical elements detachably mounted on said radially movable elements, stationary actuating means engageable with said radially movable elements for actuating the latter, another stationary actuating means for tilting said optical element carriers relative to the said radially movable elements, both said stationary means being so correlated as to impart motions to the respective actuated elements which compose into a resultant, determining a direction and speed of movement for said optical elements when in the path of the light beam such as will cause the beam of light affected by said optical elements to move in the direction and with a speed corresponding to the direction and speed of movement of the movable surface.

In testimony whereof we have signed our names to this specification.

VICTOR CONTINSOUZA.
MAURICE COMBES.